United States Patent Office 3,225,044
Patented Dec. 21, 1965

3,225,044
OXIDATION OF PHOSPHOROTHIONATES WITH
DINITROGEN TETROXIDE
Walter Dauterman and Richard D. O'Brien, Ithaca, N.Y.,
assignors to American Cyanamid Company, New York,
N.Y., a corporation of Maine
No Drawing. Filed Mar. 9, 1961, Ser. No. 94,417
8 Claims. (Cl. 260—250)

The present invention relates to a process for the oxidation of the P=S group in organophosphorous compounds to P=O and more particularly to the oxidation of insecticidally active phosphorothionate and phosphorodithioate to their oxygen analogues.

In the description hereinbelow the term phosphorothionate as employed includes any organophosphorous compound characterized by the presence of a P=S.

It is well known that of the phosphorothionates of the type to be described more fully hereinafter a substantial number of them are insecticidally active as are their oxygen analogues. While in some instances it may be comparatively easy to prepare the phosphorothionates, the preparation of its corresponding oxygen analogue may be difficult both from the point of view of the preparation of the required intermediates or for that matter the actual synthesis of the oxygen analogue once the intermediates have been prepared. This may be so even where the intermediate is the phosphorothionate unless there were a simple and inexpensive oxidation process. For example the compound S - (1,2 - dicarbethoxyethyl)O,O-dimethyl phosphorodithioate, usually identified as malathion, is a highly regarded insecticidally active compound. Its corresponding oxygen analogue is also insecticidally active. With a satisfactory and simple oxidation process the synthesis of its oxygen analogue could be less expensive from malathion than from any other intermediate.

Because of these and other advantages various processes have been attempted heretofore which were designed to convert phosphorothionates to their oxygen analogues. Thus, the use of bromine water and nitric acid as oxidizing mediums have been considered. While the bromine water procedure is suitable in some instances, it must be carried out in water and thus is not suited for use with compounds that are hydrolytically unstable. Nitric acid oxidations are often difficult to control and are also unsuited for use with hydrolytically unstable compounds.

Thus, it is an object of the present invention to provide a novel process for the oxidation of phosphorothionates to their corresponding oxygen analogues which, insofar as we are aware, has general application to all phosphorothionates whereby they may be converted to their oxygen analogues.

It is a further object of the present invention to provide such a process which in general is easy to control, is carried out simply and under mild conditions and which may be carried out employing hydrolytically unstable compounds.

These and other objects and advantages of the present invention will become more apparent from the detailed description thereof set forth hereinbelow.

In accordance with the present invention, a process is provided for converting phosphorothionates to their oxygen analogues which comprises dissolving said phosphorothionate in a substantially anhydrous solvent therefor and thereafter contacting said solution with dinitrogen tetroxide to convert phosphorothionate to its oxygen analogue.

It is believed that the process of this invention is applicable generally to phosphorothionates, though it will be readily appreciated that it is not equally efficient with regard to either the quantity or quality of the oxidation products of all phosphorothionates.

Preferably these phosphorothionates are insecticidally active and will be characterized by the presence of at least one group having the following configuration:

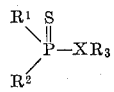

wherein X is O or S, $R^1$ and $R^2$ are selected from the group consisting of lower alkyl, lower alkoxyl (such as $CH_3O—$, $C_2H_5O—$ and the like), alkylamino, alkylthio, phenyl and phenoxyl, and $R_3$ is an organic radical. It will be evident that there are an enormous number of variations in $R_3$ which will readily suggest themselves to those skilled in the art.

By way of illustration and not by way of limitation, the phosphorothionates contemplated for use in the process of this invention may be those of the type described in U.S.P. 2,494,283, U.S.P. 2,494,284, U.S.P. 2,520,393, U.S.P. 2,565,920, U.S.P. 2,565,921, U.S.P. 2,578,652, U.S.P. 2,586,655, U.S.P. 2,596,076, U.S.P. 2,630,451, U.S.P. 2,632,020, U.S.P. 2,644,002, U.S.P. 2,664,437, U.S.P. 2,748,146, U.S.P. 2,754,243, U.S.P. 2,758,115, U.S.P. 2,759,937, U.S.P. 2,759,938, U.S.P. 2,761,806, U.S.P. 2,836,612, U.S.P. 2,855,422, U.S.P. 2,918,468, U.S.P. 2,952,700, German Patent No. 1,039,070, and Belgian Patents Nos. 579,006 and 576,263.

It will be appreciated that many of the compounds described in the above illustrative patents, such as U.S.P. 2,565,920, U.S.P. 2,565,921, U.S.P. 2,586,655 and U.S.P. 2,952,700, contain a sulfide sulfur. When these compounds are oxidized in accordance with this invention, the corresponding sulfoxide of the oxygen analogue is normally produced In accordance with this invention it will be appreciated that the term oxygen analogue is intended to include such oxidation products.

Preferably the phosphorothionate should not contain radicals which are oxidized to produce undesirable by-products. Thus, for example, unsubstituted or monosubstituted amide groups can produce explosive product mixtures.

The solvent employed in the present process is a solvent for the phosphorothionate and preferably also a solvent for the resulting oxygen analogue. It should be anhydrous, i.e. contain at most 1 or 2% water, and inert with respect to both these materials as well as with respect to the dinitrogen tetroxide oxidizing agent employed in the present process. The halogenated hydrocarbons and in particular the chlorinated hydrocarbons seem to be particularly well suited for use in the present invention, although various ethers, hydrocarbons and other conventional solvents may be employed. Suitable solvents include methylene chloride, ethylene chloride, butylene chloride, ether, diethers of ethylene glycol and diethylene glycol, benzene, toluene, aliphatic hydrocarbons such as hexane, heptane and octane, chloroform, carbon tetrachloride and the like.

By dinitrogen tetroxide as that term is employed herein it is intended to include oxides of nitrogen in which nitrogen has a valence of greater than 2 and preferably 4 including mixtures of such oxides with oxygen and minor amounts of oxides of nitrogen in which nitrogen has a valence of 2. It is highly preferred that such mixtures are free of oxides of nitrogen in which the nitrogen has a valence of 2 or lower. Thus nitrogen dioxide, dinitrogen trioxide, dinitrogen tetroxide and dinitrogen pentoxide and their equilibrium mixtures under the process conditions of this invention are contemplated. Dinitrogen tetroxide per se, which is considered to be an equilibrium mixture between $N_2O_4$ and $NO_2$, is preferred.

In accordance with this invention, gaseous dinitrogen tetroxide may be bubbled into the solvent-phosphorothionate mixture to oxidize the phosphorothionate, or a solution of solid dinitrogen tetroxide may also be employed.

The oxidation reaction is carried out at temperatures of from between about $-70°$ C. and about $+50°$ C. though preferably is carried out in a temperature of from between about 0 to about 30° C. The times of reaction may vary from comparatively few seconds to hours, depending upon the degree of oxidation desired, the particular phosphorothionate involved, solvent, temperature employed and other variables.

After contacting the phosphorothionate in the solvent medium with the dinitrogen tetroxide, the oxygen analogue may then be isolated if desired by distillation or other conventional procedures.

It should be noted that in many instances it may be desirable not to isolate the oxygen analogue but simply to recover the oxidation reaction mixture by removing the solvent therefrom. Such mixtures may in many instances prove to have a better spectrum of insecticidal activity than either of the components, namely the phosphorothionate or its oxygen analogue employed alone.

In order that the present invention may be more fully understood, the following examples are given primarily by way of illustration. No specific details or enumerations contained therein should be construed as limitations on the present invention except insofar as they appear in the appended claims. All parts and percentages are by weight unless otherwise specifically designated.

EXAMPLE 1

A series of experiments (A–D) were carried out in which 1 gram of technical grade (95% phosphorothionate) malathion (S-(1,2-dicarbethoxyethyl)O,O-dimethyl phosphorodithioate) is dissolved in 50 milliliters of the designated solvent identified in Table I hereinbelow. These solutions are chilled to the indicated temperature and thereafter $NO_2$ gas from a cylinder was passed directly into the chilled solutions slowly in order not to vary the temperature significantly. The solution turned green. When the color darkened, i.e. became a dark green, substantial oxidation had occured.

Thereafter, the gas and solvent were evaporated to recover the product.

The conditions of experiments A through D are outlined in Table I hereinbelow.

*Table I*

| Experiment | Solvent | Temperature | Time,* sec. |
|---|---|---|---|
| A | Methylene chloride | 0±5° C | 25 |
| B | CHCl₃ | 0±4° C | 60 |
| C | Methylene chloride | −66 to −68°C | 35 |
| D | do | −30° C | 55 |

*Actual gassing time. Total time greater, due to time allowed for cooling off. Thus when temperature rose gas shut off to allow to cool.

Infrared analysis was employed to indicate the results of the experiments A through D.

The results of the analysis appear in Table II hereinbelow.

*Table II*

| Experiment: | Percent oxygen analogue in mixture |
|---|---|
| A | 32 |
| B | 24 |
| C | 53 |
| D | 40 |

Table II hereinabove demonstrates that substantial conversion to the oxygen analogue is effected by employing the process of this invention.

EXAMPLE 2

Nitric oxide with $N_2$ was passed into a solution containing 50 milliliters of chloroform and 12 grams of S-(1,2-dicarbethoxyethyl)O,O - dimethylphosphorodithioate for 15 minutes at $-40°$ C. The solution turned green. Similarly another sample was gassed for 15 minutes at 25° C. Here again a green color occurred. However, infrared analysis demonstrated that the oxygen analogue of the thionophosphate was not produced. This example demonstrates that NO is not an oxidizing agent in accordance with the process of this invention.

EXAMPLE 3

3.30 grams (0.01 mole) of S-(1,2-dicarbethoxyethyl) O,O-dimethylphosphorodithioate (malathion) is dissolved in 30 milliliters of an inert solvent and dry gaseous dinitrogen tetroxide is introduced into the solution for a period of five minutes. During the introduction of the gas the reaction mixture is maintained at a constant temperature by means of a cooling bath. The solution is allowed to stand at the original reaction temperature for varying periods of time as indicated in the table below. The solvent and excess oxidant are removed under vacuum with no external heating and the blue to green residue taken up in 20 ml. of chloroform and washed with 5 ml. of 20% potassium bicarbonate solution. The bicarbonate layer is extracted twice with 5 ml. of chloroform and the three chloroform fractions combined, dried over magnesium sulfate and stripped under vacuum. The resultant liquid residue is analyzed by vapor phase chromatography. Table III contains data for some typical runs.

*Table III*

| Run | Time (hrs.) | Temp., °C. | Solvent | Yield (g.) | Product composition, percent | |
|---|---|---|---|---|---|---|
| | | | | | Oxygen analogue | Thiono compound |
| A | 4 | 25 | Ether | 2.40 | 47 | 0 |
| B | 16 | 25 | do | 2.22 | 75 | 0 |
| C | 16 | 25 | Methylene chloride | 2.31 | 80 | 0 |
| D | 4 | −72 to −67 | do | 2.53 | 45 | 1 |
| E | 1 | 25 | do | 2.96 | 54 | 10 |
| F | 1⅔ | 25 | do | 2.84 | 52 | 11 |
| G | 4 | 25 | do | 2.46 | 53 | 0 |

EXAMPLE 4

3.66 grams (0.02 mole) of O,O-diethyl-O-p-nitrophenyl phosphorothioate is oxidized with dinitrogen tetroxide to diethyl p-nitrophenyl phosphate using the procedure of Example 3, with the exception that the time of gas introduction is fifteen minutes or a half hour. Results of typical runs are contained in Table IV, the product composition being determined by vapor phase chromatography.

Table IV

| Run | Gas introduction time (hrs.) | Standing time (hrs.) | Temp., °C. | Solvent | Yield (g.) | Product composition, percent | |
|---|---|---|---|---|---|---|---|
| | | | | | | Oxygen analogue | Thiono compound |
| A | 0.5 | 0 | 25 | Methylene chloride. | 3.11 | 57 | 36 |
| B | 0.5 | 0 | 25 | Ether | 3.38 | 28 | 73 |
| C | 0.5 | 16 | 25 | ____do____ | 3.29 | 93 | 6 |
| D | 0.25 | 4 | 25 | Methylene chloride. | 2.49 | 84 | 2 |

EXAMPLE 5

O,O,S-trimethyl phosphorodithioate (3.44 grams, 0.02 mole) in 50 ml. of chloroform is treated with dinitrogen tetroxide at 10° C. until the exit gases become brown. The reaction mixture is then allowed to stand for two hours. The liquid product obtained exhibits a band in the infrared spectrum at 1250 cm.$^{-1}$, indicative of oxidation of P=S to P=O.

EXAMPLE 6

O,O-diethyl O-pyrazinyl phosphorothioate (2.48 grams, 0.01 mole) in 30 ml. of methylene chloride is treated with dinitrogen tetroxide for five minutes at −10° to −12° C. Immediate workup according to the procedure of Example 1 leaves 1.56 grams of yellow-brown liquid whose infrared spectrum shows the presence of the P=O group.

EXAMPLE 7

S-carboxymethyl O,O-dimethyl phosphorothioate (2.16 grams, 0.01 mole) is oxidized in chloroform with dinitrogen tetroxide at 5–1° C. until the solution turns a deep green color. The cloudy reaction mixture is allowed to stand for ½ hour at 0° C. and three hours at room temperature. Removal of the solvent leaves a red liquid whose infrared spectrum shows the presence of the P=O group.

We claim:

1. A readily controllable non-explosive process for converting a compound of the formula:

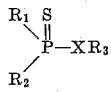

to its oxygen analogues, where in said formula X is selected from the group consisting of O and S, R$_1$ and R$^2$ are selected from the group consisting of lower alkyl, lower alkoxyl, alkylamino, alkylthio, phenyl and phenoxyl, and R$_3$ is selected from the group consisting of carbamylalkyl, thiocarbamylalkyl, alkoxyalkyl, alkylmercapto, phenyl, nitrophenyl, halophenyl, alkylphenyl, cyanomethyl, pyrimidinyl, 3-halogen cumarinyl, acetyl lower alkyl, 3-pyridazinyl, 2-pyrazinyl, alkyl mercapto alkyl, alkyl sulfoxyl alkyl, alkyl sulfonyl alkyl, benzaziminomethyl, succiniminyl, —CH$_2$—X—R$_4$ where X is as defined above and —R$_4$ is an aliphatic hydrocarbon radical, and

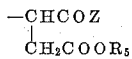

where —R$_5$ is selected from the group consisting of hydrogen, aliphatic hydrocarbon and aromatic hydrocarbon, and Z is selected from the group consisting of —OR$_5$ where R$_5$ is as defined above, and

where R$_6$ is selected from the group consisting of alkyl and aryl and R$_7$ is selected from the group consisting of hydrogen and alkyl, which comprises dissolving said compound in an anhydrous solvent therefor, contacting said solution with gaseous dinitrogen tetroxide, said solvent being inert with respect to the dinitrogen tetroxide.

2. A readily controllable non-explosive process for converting O,O-diethyl-O-pyrazinyl phosphorothioate to its oxygen analogue which comprises dissolving said phosphorothioate in an anhydrous solvent therefor, contacting said solution with gaseous dinitrogen tetroxide to convert said phosphorothiaoate to its oxygen analogue, said solvent being inert with respect to dinitrogen tetroxide.

3. A readily controllable non-explosive process for converting S-(1,2-dicarbethoxyethyl) O,O-dimethyl phosphorodithioate to its oxygen analogue which comprises dissolving said phosphorodithioate in an anhydrous solvent therefor, contacting said solution with gaseous dinitrogen tetroxide to convert the phosphorodithioate to its oxygen analogue, said solvent being inert with respect to dinitrogen tetroxide.

4. A readily controllable non-explosive process for converting O,O-diethyl-O-p-nitrophenyl phosphorothioate to its oxygen analogue which comprises dissolving said phosphorothioate in an anhydrous solvent therefor, contacting said solution with gaseous dinitrogen tetroxide to convert the phosphorothioate to its oxygen analogue said solvent being inert with respect to dinitrogen tetroxide.

5. A readily controllable non-explosive process for converting a compound of the formula:

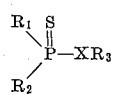

to its oxygen analogues, where in said formula X is selected from the group consisting of O and S, R$_1$ and R$_2$ are selected from the group consisting of lower alkyl, lower alkoxyl, alkylamino, alkylthio, phenyl and phenoxyl, and R$_3$ is selected from the group consisting of carbamylalkyl, thiocarbamylalkyl, alkoxyalkyl, alkylmercapto, phenyl, nitrophenyl, halophenyl, alkylphenyl, cyanomethyl, pyrimidinyl, 3-halogen coumarinyl, acetyl lower alkyl, 3-pyridazinyl, 2-pyrazinyl, alkyl mercapto alkyl, alkyl sulfoxyl alkyl, alkyl sulfonyl alkyl, benzaziminomethyl, succiniminyl, —CH$_2$—X—R$_4$ where X is as defined above and —R$_4$ is an aliphatic hydrocarbon radical, and

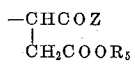

where —R$_5$ is selected from the group consisting of hydrogen, aliphatic hydrocarbon and aromatic hydrocarbon, and Z is selected from the group consisting of —OR$_5$ where R$_5$ is as defined above, and

where R$_6$ is selected from the group consisting of alkyl and aryl and R$_7$ is selected from the group consisting of hydrogen and alkyl, which comprises dissolving said compound in an anhydrous solvent therefor, bubbling gaseous dinitrogen tetroxide through said solvent mixture, said solvent being a solvent for said oxygen analogues and being inert with respect to the dinitrogen tetroxide.

6. A readily controllable non-explosive process for converting a compound of the formula:

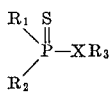

to its oxygen analogues, where in said formula X is selected from the group consisting of O and S, $R_1$ and $R_2$ are selected from the group consisting of lower alkyl, lower alkoxyl, alkylamino, alkylthio, phenyl and phenoxyl, and $R_3$ is selected from the group consisting of carbamylalkyl, thiocarbamylalkyl, alkoxyalkyl, alkylmercapto, phenyl, nitrophenyl, halophenyl, alkylphenyl, cyanomethyl, pyrimidinyl, 3-halogen coumarinyl, acetyl lower alkyl, 3-pyridazinyl, 2-pyrazinyl, alkyl mercapto alkyl, alkyl sulfoxyl alkyl, alkyl sulfonyl alkyl, benzaziminomethyl, succiniminyl, —$CH_2$—X—$R_4$ where X is as defined above and —$R_4$ is an aliphatic hydrocarbon radical, and

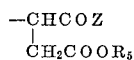

where —$R_5$ is selected from the group consisting of hydrogen, aliphatic hydrocarbon and aromatic hydrocarbon, and Z is selected from the group consisting of —$OR_5$ where $R_5$ is as defined above, and

where $R_6$ is selected from the group consisting of alkyl and aryl and $R_7$ selected from the group consisting of hydrogen and alkyl, which comprises dissolving said compound in an anhydrous solvent therefor, continuously bubbling gaseous dinitrogen tetroxide through said solvent mixture, said solvent being a solvent for said oxygen analogues and being inert with respect to the dinitrogen tetroxide.

7. A readily controllable non-explosive process for converting a compound of the formula:

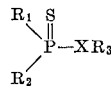

to its oxygen analogues, where in said formula X is selected from the group consisting of O and S, $R_1$ and $R_2$ are selected from the group consisting of lower alkyl, lower alkoxyl, alkylamino, alkylthio, phenyl and phenoxyl, and $R_3$ is selected from the group consisting of carbamylalkyl, thiocarbamylalkyl, alkoxyalkyl, alkylmercapto, phenyl, nitrophenyl, halophenyl, alkylphenyl, cyanomethyl, pyrimidinyl, 3-halogen coumarinyl, acetyl lower alkyl, 3-pyridazinyl, 2-pyrazinyl, alkyl mercapto alkyl, alkyl sulfoxyl alkyl, alkyl sulfonyl alkyl, benzaziminomethyl, succiniminyl, —$CH_2$—X—$R_4$ where X is as defined above and —$R_4$ is an aliphatic hydrocarbon radical, and

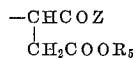

where —$R_5$ is selected from the group consisting of hydrogen, aliphatic hydrocarbon and aromatic hydrocarbon, and Z is selected from the group consisting of —$OR_5$ where $R_5$ is as defined above, and

where $R_6$ is selected from the group consisting of alkyl and aryl and $R_7$ is selected from the group consisting of hydrogen and alkyl, which comprises dissolving said compound in an anhydrous chlorinated hydrocarbon solvent therefor, bubbling gaseous dinitrogen tetroxide through said solvent mixture, said chlorinated hydrocarbon being a solvent for the said oxygen analogues and being inert with respect to the dinitrogen tetroxide.

8. A readily controllable non-explosive process for converting a compound of the formula:

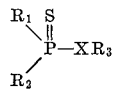

to its oxygen analogues, where in said formula X is selected from the group consisting of O and S, $R_1$ and $R_2$ are selected from the group consisting of lower alkyl, lower alkoxyl, alkylamino, alkylthio, phenyl and phenoxyl, and $R_3$ is selected from the group consisting of carbamylalkyl, thicarbamylalkyl, alkoxyalkyl, alkylmercapto, phenyl, nitrophenyl, halophenyl, alkylphenyl, cyanomethyl, pyrimidinyl, 3-halogen coumarinyl, acetyl lower alkyl, 3-pyridazinyl, 2-pyrazinyl alkyl mercapto alkyl, alkyl sulfoxyl, alkyl sulfonyl alkyl, benzaziminomethyl, succiniminyl, —$CH_2$—X—$R_4$ where X is as defined above and —$R_4$ is an aliphatic hydrocarbon radical, and

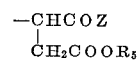

where —$R_5$ is selected from the group consisting of hydrogen, aliphatic hydrocarbon and aromatic hydrocarbon, and Z is selected from the group consisting of —$OR_5$ where $R_5$ is as defined above, and

where $R_6$ is selected from the group consisting of alkyl and aryl and $R_7$ is selected from the group consisting of hydrogen and alkyl, which comprises dissolving said compound in an anhydrous solvent therefor, bubbling gaseous dinitrogen tetroxide through said solvent mixture at a temperature of from about —70° C. to about +50° C., said solvent being a solvent for said oxygen analogues and being inert with respect to the dinitrogen tetroxide.

References Cited by the Examiner
UNITED STATES PATENTS

| | | | |
|---|---|---|---|
| 1,332,028 | 2/1920 | Coblenz et al. | 260—524 |
| 2,713,018 | 7/1955 | Johnson | 260—461 |

OTHER REFERENCES

Clingman et al.: Ind, and Eng. Chem., volume 50, No. 5 (May 1958), pages 777–80.

Ephraim: Inorganic Chemistry, sixth English edition, 1954, pages 696–703.

Kirk-Ohtmer (editors): Encyclopedia of Chem. Tech., volume 9 (1952), pages 416–17.

Kosolapoff: Organic Phosphorus Compounds (1950), page 237.

NICHOLAS S. RIZZO, *Primary Examiner.*

IRVING MARCUS, WALTER A. MODANCE,
*Examiners.*